(12) United States Patent
Hatano

(10) Patent No.: US 7,823,985 B2
(45) Date of Patent: Nov. 2, 2010

(54) BRAKE SYSTEM

(75) Inventor: Kunimichi Hatano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 468 days.

(21) Appl. No.: 12/075,620

(22) Filed: Mar. 12, 2008

(65) Prior Publication Data

US 2008/0238646 A1 Oct. 2, 2008

(30) Foreign Application Priority Data

Mar. 27, 2007 (JP) ............................ 2007-081220

(51) Int. Cl.
*B60T 8/32* (2006.01)
(52) U.S. Cl. .............. 303/115.2; 303/114.1; 303/122.1; 303/122.14
(58) Field of Classification Search ............. 188/151 R, 188/152, 358; 303/114.1, 114.3, 115.1, 115.2, 303/122, 122.03, 122.05, 122.09–122.14
See application file for complete search history.

(56) References Cited

U.S. PATENT DOCUMENTS

| | | | | |
|---|---|---|---|---|
| 5,433,514 A | * | 7/1995 | Tsukamoto et al. | 303/113.2 |
| 5,567,021 A | * | 10/1996 | Gaillard | 303/3 |
| 5,887,954 A | | 3/1999 | Steiner et al. | |
| 6,033,036 A | * | 3/2000 | Ruffer et al. | 303/114.1 |
| 6,164,733 A | * | 12/2000 | Uzzell | 303/122 |
| 6,315,370 B1 | * | 11/2001 | Feigel et al. | 303/115.2 |
| 6,945,610 B1 | * | 9/2005 | Mizutani et al. | 303/114.1 |
| 6,979,062 B2 | * | 12/2005 | Yoshino et al. | 303/116.2 |
| 7,651,176 B2 | * | 1/2010 | Inoue et al. | 303/114.1 |
| 2003/0020327 A1 | * | 1/2003 | Isono et al. | 303/113.4 |
| 2006/0202551 A1 | | 9/2006 | Gottwick et al. | |
| 2008/0191548 A1 | * | 8/2008 | Bond et al. | 303/115.1 |

FOREIGN PATENT DOCUMENTS

| | | |
|---|---|---|
| DE | 3424912 A1 | 1/1986 |
| JP | 2006-306221 | 11/2006 |
| WO | WO 99/39950 | 8/1999 |

\* cited by examiner

*Primary Examiner*—Christopher P Schwartz
(74) *Attorney, Agent, or Firm*—Carrier, Blackman & Associates P.C.; William D. Blackman; Joseph P. Carrier

(57) ABSTRACT

A brake system includes a master cylinder which generates brake fluid pressure by a braking operation of a driver, an electric motor driven slave cylinder that generates brake fluid pressure according to an electrical signal based on the braking operation of the driver, a vehicle wheel cylinder for braking a wheel by the brake fluid pressure generated in the master cylinder or the slave cylinder, a brake light that informs a following vehicle of the operation of the wheel cylinder, and a first sensor and a second sensor that detect stroke positions of the brake pedal. During normal operation of the brake system the brake fluid pressure generated in the slave cylinder is transferred to the wheel cylinder. During abnormal operation of the brake system, the brake fluid pressure generated in the master cylinder is transferred to the wheel cylinder. Further, the first sensor activates the brake light when the slave cylinder operates normally, and the second sensor activates the brake light when the slave cylinder does not operate normally.

12 Claims, 4 Drawing Sheets

BRAKE SYSTEM

CROSS REFERENCE TO RELATED APPLICATIONS

The present invention claims priority under 35 USC §119 based on Japanese patent application No. 2007-81220 filed 27 Mar. 2007. The subject matter of this priority document is incorporated by reference herein.

BACKGROUND OF THE INVENTION

1. Field of the Invention

The present invention relates to a brake system comprising a master cylinder that generates brake fluid pressure by a braking operation of a driver, and an electric motor-driven slave cylinder that generates brake fluid pressure according to an electrical signal based on the braking operation of the driver.

2. Description of the Related Art

Japanese Patent Application Laid-open No. 2006-306221 discloses a brake system of the type referred to as a brake-by-wire (BBW) brake system, which converts a braking operation of a driver into an electrical signal used to operate an electric brake force generator or generating means, such as a slave cylinder, and operates a wheel cylinder by brake fluid pressure generated by the slave cylinder.

In this BBW brake system, the fluid pressure chamber of the master cylinder is in communication with the wheel cylinder through the fluid pressure chamber of the slave cylinder. When the driver depresses the brake pedal, the piston of the slave cylinder first closes a port in communication with the master cylinder in order to generate brake fluid pressure, and slightly thereafter the piston of the master cylinder closes a port in communication with a fluid reservoir in order to generate brake fluid pressure. This is because, if the above-described order is reversed, the brake fluid pressure generated by the master cylinder is transmitted to the wheel cylinder through the fluid pressure chamber of the slave cylinder before the driver sufficiently depresses the brake pedal and the slave cylinder generates brake fluid pressure, resulting in an undesirable situation in which the thus-transmitted brake fluid pressure of the master cylinder affects the control of the brake fluid pressure by the slave cylinder.

In general, a given vehicle's brake light which informs a following vehicle of the braking operation of the given vehicle is lit up when the driver depresses the brake pedal and the brake light switch turns on. However, in the conventional BBW brake system, the wheel cylinder is operated by the brake fluid pressure generated by the slave cylinder during normal system operation and the wheel cylinder is operated by the brake fluid pressure generated by the master cylinder during abnormal system operation. Therefore, if the brake light is set so as to light up at the timing at which the slave cylinder generates brake fluid pressure during normal system operation, a delay occurs in the timing at which the brake light lights up during abnormal system operation where braking is performed by the brake fluid pressure generated by the master cylinder. Conversely, if the brake light is set so as to light up at a timing at which the master cylinder generates brake fluid pressure during abnormal system operation, the brake light lights up too early during normal system operation where braking is performed by the brake fluid pressure generated by the slave cylinder.

SUMMARY OF THE INVENTION

The present invention has been made in view of the above circumstances, and an object thereof is to light up a brake light at a proper timing during both normal system operation and abnormal system operation.

To achieve the above object, according to a first aspect of the present invention, there is provided a brake system comprising: a master cylinder that generates brake fluid pressure by a braking operation of a driver; an electric motor-driven slave cylinder that generates brake fluid pressure according to an electrical signal based on the braking operation of the driver; a wheel cylinder that brakes a wheel by the brake fluid pressure of the master cylinder or the slave cylinder; a brake light that informs a following vehicle of the operation of the wheel cylinder; and a first sensor and a second sensor that detect stroke positions of the brake pedal, wherein the brake fluid pressure of the slave cylinder is transmitted to the wheel cylinder when the slave cylinder operates normally, and the brake fluid pressure of the master cylinder is transmitted to the wheel cylinder through the slave cylinder when the slave cylinder does not operate normally, and wherein the first sensor activates the brake light based on a timing at which the slave cylinder generates brake fluid pressure when the slave cylinder operates normally, and the second sensor activates the brake light based on a timing at which the master cylinder generates brake fluid pressure when the slave cylinder does not operate normally.

With the first aspect of the present invention, the brake system comprises the first sensor and the second sensor that activate the brake light while detecting stroke positions of the brake pedal; the first sensor activates the brake light based on a timing at which the slave cylinder generates brake fluid pressure when the slave cylinder operates normally and the brake fluid pressure of the slave cylinder is transmitted to the wheel cylinder; and the second sensor activates the brake light based on a timing at which the master cylinder generates brake fluid pressure when the slave cylinder does not operate normally and the brake fluid pressure of the master cylinder is transmitted to the wheel cylinder through the slave cylinder that has become inoperative. Therefore, it is possible to activate the brake light at an appropriate timing during both the normal system operation and the abnormal system operation.

According to a second aspect of the present invention, in addition to the first aspect, the first sensor is a sensor that generates an electrical signal responsive to an operating amount of the brake pedal by the driver.

With the second aspect of the present invention, the first sensor, which activates the brake light based on a timing at which the slave cylinder generates brake fluid pressure when the slave cylinder operates normally, also serves as a sensor that generates an electrical signal responsive to the operating amount of the brake pedal by the driver in order to operate the slave cylinder. Therefore, it is possible to reduce the number of sensors required by the system.

According to a third aspect of the present invention, in addition to the first or second aspect, the brake system further comprises a first fluid pressure sensor which detects brake fluid pressure generated by the master cylinder, and a second fluid pressure sensor which detects brake fluid pressure generated by the slave cylinder, wherein the slave cylinder generates brake fluid pressure so that the brake fluid pressure detected by the second fluid pressure sensor is adjusted to a level corresponding to the brake fluid pressure detected by the first fluid pressure sensor.

With the third aspect of the present invention, when braking is performed by the brake fluid pressure generated by the slave cylinder which is operated based on an electrical signal responsive to the braking operation by the driver, the first fluid pressure sensor detects the brake fluid pressure generated by the master cylinder, the second fluid sensor detects the brake fluid pressure generated by the slave cylinder, and the slave cylinder generates brake fluid pressure such that the brake fluid pressure detected by the second fluid pressure sensor is adjusted to a level corresponding to the brake fluid pressure detected by the first fluid pressure sensor. Therefore, it is possible to cause the slave cylinder to generate brake fluid pressure corresponding to the operational amount of the master cylinder, thereby providing a braking force required by the driver.

According to a fourth aspect of the present invention, in addition to the first or second aspect, the brake system further comprises a stroke simulator connected to the master cylinder through a reaction force permission valve, wherein the stroke simulator absorbs the brake fluid pressure generated by the master cylinder by opening the reaction force permission valve during normal system operation; and the brake fluid pressure generated by the master cylinder is supplied to the wheel cylinder by closing the reaction force permission valve during abnormal system operation.

With the fourth aspect of the present invention, the stroke simulator is connected to the master cylinder through the reaction force permission valve, and the brake fluid pressure generated by the master cylinder is absorbed by the stroke simulator when the reaction force permission valve is opened during normal system operation. Therefore, it is possible to provide a pedal feeling equivalent to that provided when braking by the brake fluid pressure generated by the master cylinder, thereby eliminating any possibility that the driver may experience an uncomfortable feeling. Further, because the brake fluid pressure generated by the master cylinder is supplied to the wheel cylinder without being absorbed by the stroke simulator when the reaction force permission valve is closed during abnormal system operation, it is possible to perform braking by the brake fluid pressure generated by the master cylinder without any problem even when the slave cylinder becomes inoperative.

According to a fifth aspect of the present invention, in addition to the third aspect, the brake system further comprises a trouble determining device which determines when the first fluid pressure sensor has failed, wherein the trouble determining device stores a first stroke position of the brake pedal and a first detection value of the first fluid pressure sensor when the second stroke sensor is turned on; and when a difference between a current second stroke position and the first stroke position of the brake pedal exceeds a stroke threshold value, if a difference between a current second detection value and the first detection value of the first fluid pressure sensor is less than a fluid pressure threshold value, the trouble determining device determines that the first fluid sensor has failed.

With the fifth aspect of the present invention, the trouble determining device stores the first stroke position of the brake pedal and the first detection value of the first fluid pressure sensor when the brake pedal is depressed and the second stroke sensor is turned on; and when a difference between a current second stroke position and the first stroke position of the brake pedal exceeds the stroke threshold value, if a difference between a current second detection value and the first detection value of the first fluid pressure sensor is less than the fluid pressure threshold value, that is, the detection value of the first fluid pressure sensor is not increased corresponding to the increase in the stroke position of the brake pedal, it is determined that the first fluid pressure sensor has failed.

A stroke sensor Sd of the exemplary embodiment discussed below corresponds to the first sensor of the present invention, and a brake light switch Se of the exemplary embodiment corresponds to the second sensor of the present invention.

The above-mentioned object, other objects, characteristics, and advantages of the present invention will become apparent from the present exemplary embodiment, which will be described in detail below with reference to the attached drawings.

DESCRIPTION OF THE PRESENT EMBODIMENT

Figure 1:
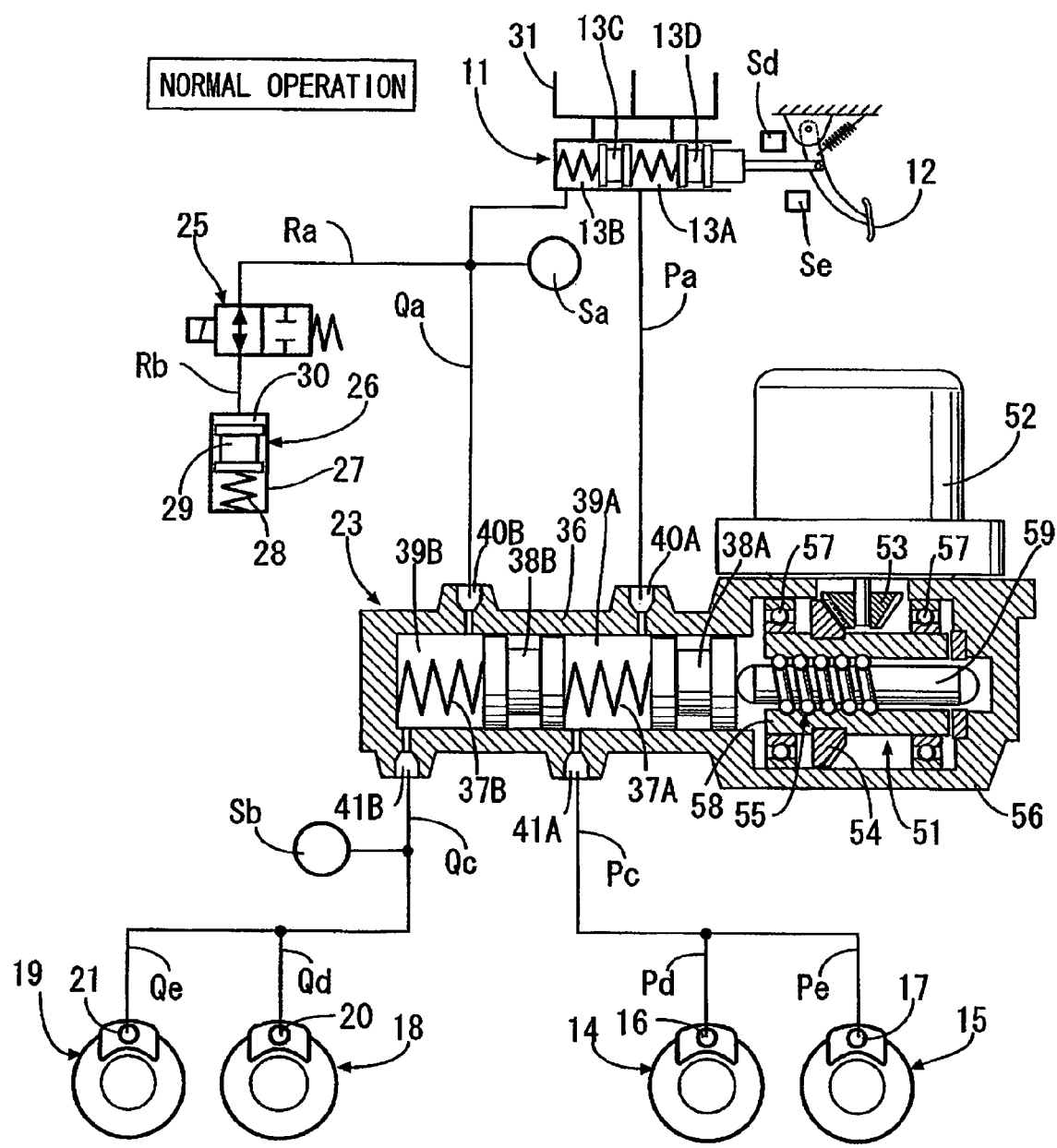
FIG. 1 is a fluid pressure circuit diagram of a vehicle brake system during normal operation, according to an exemplary embodiment of the present invention.

As shown in FIG. 1, a tandem master cylinder 11 has two first fluid pressure chambers 13A and 13B which output brake fluid pressure according to a pushing force applied to a brake pedal 12 by a driver depressing the brake pedal 12. One of the first fluid pressure chambers 13A is connected to wheel cylinders 16 and 17 of disc brake devices 14 and 15 for braking, for example, a left front wheel and a right rear wheel, through fluid passages Pa, Pc, Pd, and Pe. The other first fluid pressure chamber 13B is connected to wheel cylinders 20 and 21 of disc brake devices 18 and 19 for braking, for example, a right front wheel and a left rear wheel through fluid passages Qa, Qc, Qd, and Qe.

A slave cylinder 23 is provided between the fluid passages Pa, Qa and the fluid passages Pc, Qc. A stroke simulator 26 is connected to the fluid passages Ra and Rb branching from the fluid passage Qa via a reaction force permission valve 25 which is a normally closed solenoid valve. The stroke simulator 26 has a cylinder 27 and a piston 29 slidably fitted in the cylinder 27 while being urged by a spring 28. A fluid chamber 30, formed on the side of the piston 29 opposite from the spring 28, communicates with the fluid passage Rb.

An actuator 51 of the slave cylinder 23 has a drive bevel gear 53 provided on the rotating shaft of an electric motor 52, a follower bevel gear 54 meshing with the drive bevel gear 53, and a ball screw mechanism 55 operated by the follower bevel gear 54. A sleeve 58 is rotatably supported in an actuator housing 56 via a pair of ball bearings 57, 57. An output shaft 59 is coaxially arranged on an inner periphery of the sleeve 58. The follower bevel gear 54 is arranged on an outer periphery of the sleeve 58.

A pair of pistons 38A and 38B urged in a retreat direction by a pair of return springs 37A and 37B are slidably disposed in a cylinder body 36 of the slave cylinder 23. A pair of second fluid pressure chambers 39A and 39B are defined on the front faces of the pistons 38A and 38B, respectively. A front end of the output shaft 59 abuts on a rear end of the rear piston 38A. One of the second fluid pressure chamber 39A communicates with the fluid passages Pa, Pc via ports 40A, 41A, respectively, while the other second fluid pressure chamber 39B communicates with the fluid passages Qa, Qc through ports 40B, 41B, respectively.

The fluid passage Qa is provided with a fluid pressure sensor Sa that detects the brake fluid pressure generated by the master cylinder 11. The fluid passage Qc is provided with a fluid pressure sensor Sb that detects the brake fluid pressure generated by the slave cylinder 23. In order to control the lighting of a brake light 61 (see FIG. 3), the brake pedal 12 is provided with a stroke sensor Sd that detects the stroke of the brake pedal 12 and a brake light switch Se that detects a degree to which the brake pedal 12 is depressed by a driver. The stroke sensor Sd constitutes a first stroke sensor of the present invention, and the brake light switch Se constitutes a second stroke sensor of the present invention.

Figure 3:
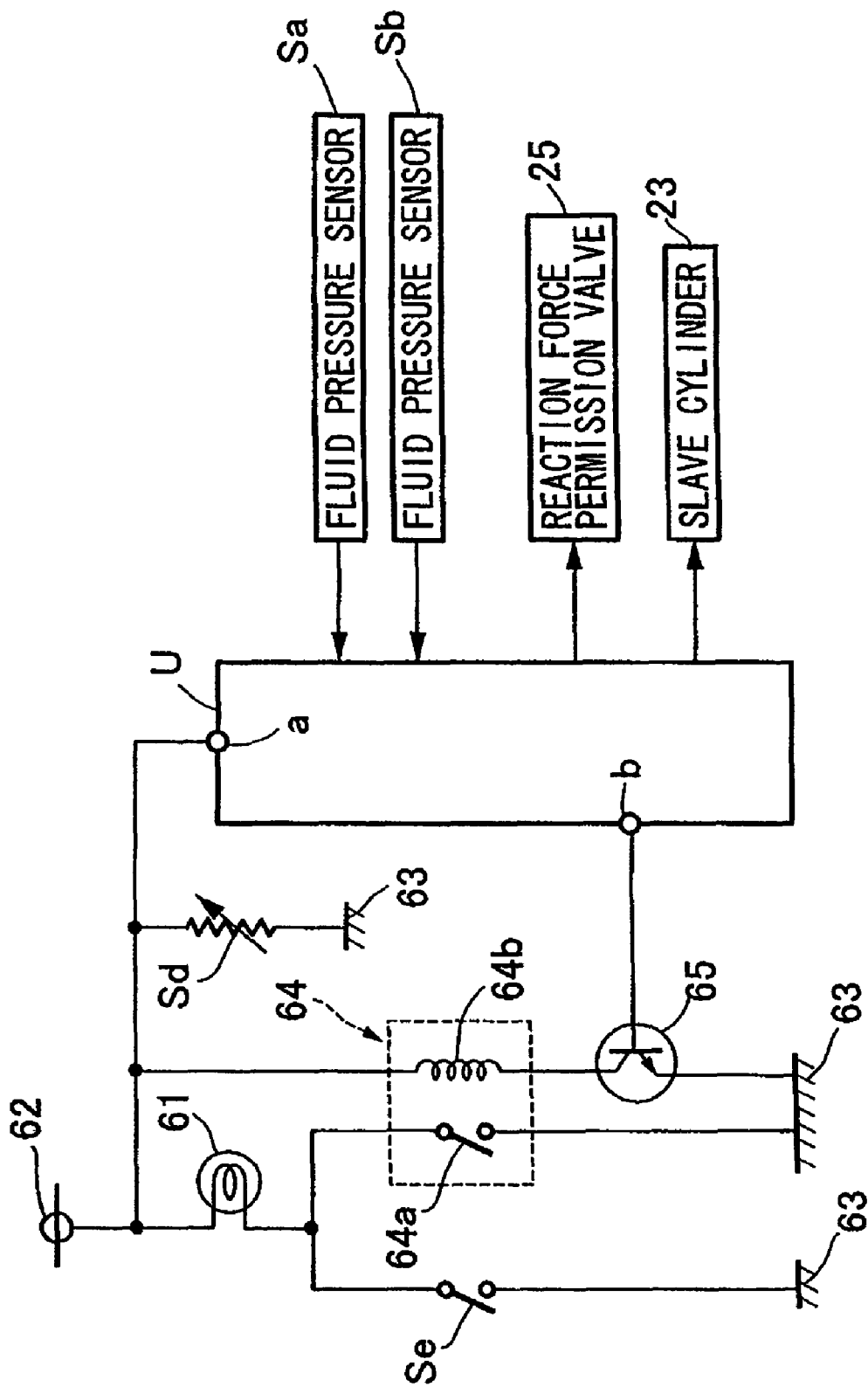
FIG. 3 is a lighting control circuit diagram of a brake light according to an exemplary embodiment of the present invention.

As shown in FIG. 3, signals are input from the fluid pressure sensor Sa, the fluid pressure sensor Sb and the stroke sensor Sd to an electronic control unit U, which controls the operation of the reaction force permission valve 25, the slave cylinder 23 and the brake light 61.

The electric circuit for controlling the operation of the brake light 61 is configured as described below. The brake light 61 and the brake light switch Se are connected in series between a battery 62 and a grounding part 63. A contact point 64a of a relay 64 is connected in parallel to the brake light switch Se. A coil 64b of the relay 64 and a transistor 65 are connected in series between the battery 62 and the grounding part 63. The stroke sensor Sd is connected between the battery 62 and the grounding part 63. A point between the battery 62 and the stroke sensor Sd is connected to a port a of the electronic control unit U. A base of the transistor 65 is connected to a port b of the electronic control unit U.

Therefore, when the driver applies a pushing force to depress the brake pedal 12 and the brake light switch Se is turned on, the brake light 61 lights up. When the driver applies the pushing force to depress the brake pedal 12 and the resistance value of the stroke sensor Sd changes, the potential of the port a changes, and the electronic control unit or controller U detects this potential change and changes the potential of the port b, whereby the transistor 65 is turned on and the brake light 61 lights up.

The stroke sensor Sd detects a stroke position of the brake pedal 12 immediately upon a pushing force being applied to the brake pedal 12, whereas the brake light switch Se is turned on the instant force is applied to the brake pedal 12 and the piston of the master cylinder 11 closes a port in communication with the reservoir 31 to generate brake fluid pressure in the first fluid pressure chambers 13A, 13B. Therefore, the stroke sensor Sd can detect operation of the brake pedal 12 earlier than the brake light switch Se does.

Next, the operation of the exemplary embodiment of the present invention having the above-described arrangement will be described.

When the brake system is operating normally, the reaction force permission valve 25, comprising a normally closed solenoid valve, is magnetized so as to be in an open state. In this state, when the stroke sensor Sd detects a pushing force on the brake pedal 12 by the driver, the actuator 51 of the slave cylinder 23 is operated. That is, when the electric motor 52 is driven in one direction, the output shaft 59 is advanced by the drive bevel gear 53, the follower bevel gear 54 and the ball screw mechanism 55, so that the pair of pistons 38A and 38B urged by the output shaft 59 are advanced. Because the ports 40A and 40B leading to the fluid passages Pa and Qa are closed quickly after the pistons 38A and 38B begin to advance, a brake fluid pressure is generated in the second fluid pressure chambers 39A and 39B. This brake fluid pressure is transmitted to the wheel cylinders 16, 17, 20 and 21 of the disc brake devices 14, 15, 18, 19, respectively, thereby braking the vehicle wheels.

At this time, the brake fluid pressure generated in the other first fluid pressure chamber 13B of the master cylinder 11 is transmitted to the fluid chamber 30 of the stroke simulator 26 through the opened reaction force permission valve 25 to move the piston 29 against the spring 28, thereby generating a pseudo pedal reaction force while permitting the stroke of the brake pedal 12 to prevent the driver from experiencing an uncomfortable feeling.

The operation of the actuator 51 for the slave cylinder 23 is controlled so that the brake fluid pressure generated by the slave cylinder 23 and detected by the fluid pressure sensor Sb provided in the fluid passage Qc has a value corresponding to the brake fluid pressure generated by the master cylinder 11 and detected by the fluid pressure sensor Sa provided in the fluid passage Qa, thereby generating the braking force in the disc brake devices 14, 15, 18, and 19 which corresponds to the pushing force applied to the brake pedal 12 by the driver.

If the slave cylinder 23 becomes inoperative due to power failure or other problem, the braking control is performed using the brake fluid pressure generated by the mater cylinder 11 in place of the brake fluid pressure generated by the slave cylinder 23.

Figure 2:
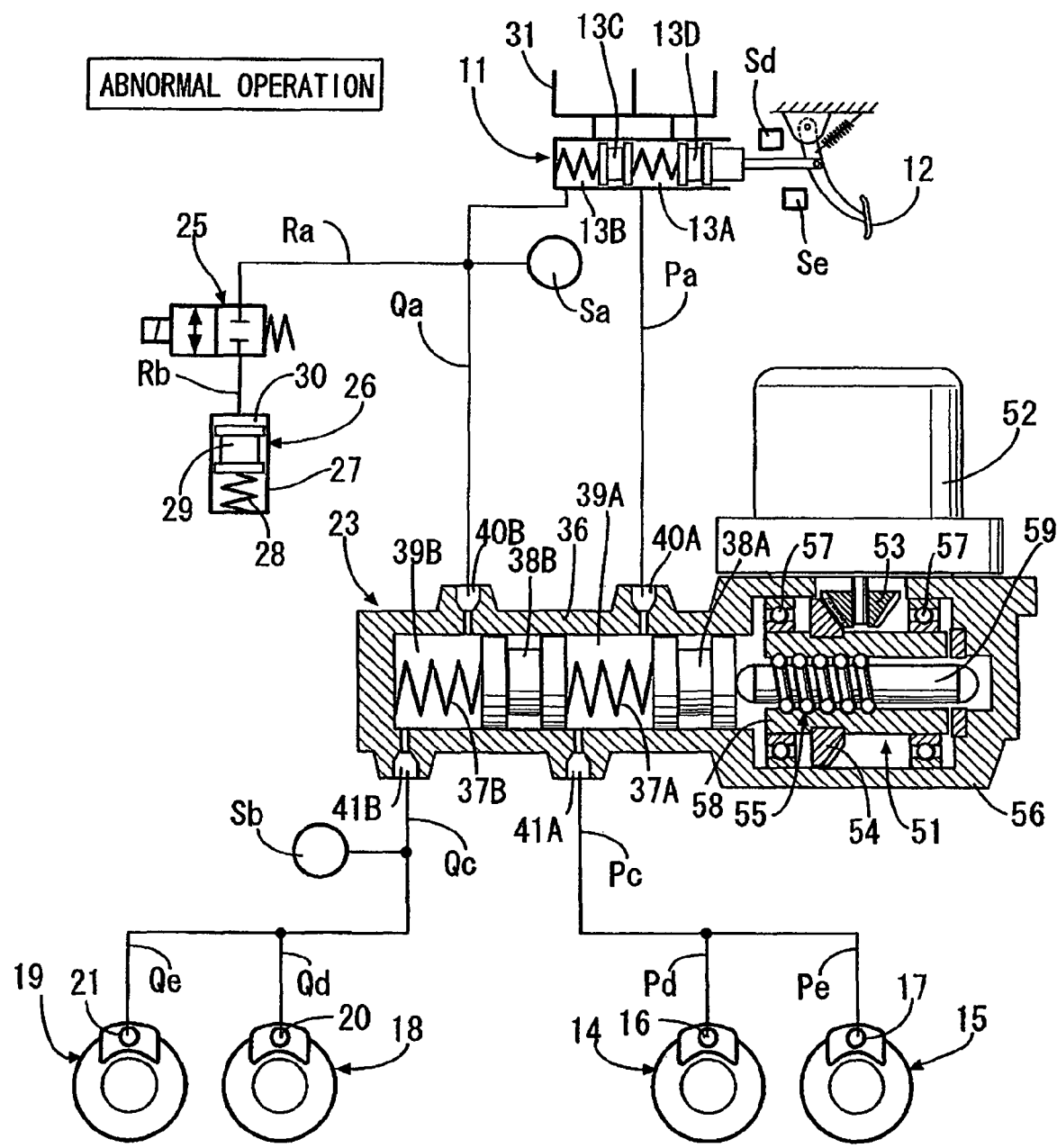
FIG. 2 is a fluid pressure circuit diagram of the vehicle brake system, corresponding to FIG. 1, during abnormal operation.

That is, in the event of power failure or other problem, as shown in FIG. 2, the reaction force permission valve 25, comprising a normally closed solenoid valve, is automatically closed. In this state, the brake fluid pressure generated in the first fluid pressure chambers 13A and 13B of the master cylinder 11 passes the second fluid pressure chambers 39A and 39B of the slave cylinder 23 without being absorbed by the stroke simulator 26, and operates the wheel cylinders 16, 17; 20, 21 of the disc brake devices 14, 15, 18 and 19, respectively, for braking the vehicle wheels, thus generating the braking force without any problem.

As described above, the first fluid pressure chambers 13A, 13B of the master cylinder 11 are in communication with the wheel cylinders 16, 17; 20, 21 through the second fluid pressure chambers 39A, 39B of the slave cylinder 23. Therefore, when the driver applies a pushing force to depress the brake pedal 12, first the pistons 38A, 38B of the slave cylinder 23 closes the ports 40A, 40B which are in communication with the master cylinder 11 to generate a brake fluid pressure, and slightly thereafter the pistons 13C, 13D of the master cylinder 11 close a port in communication with the reservoir 31 to generate a brake fluid pressure. With this arrangement, when the operator applies a pushing force to depress the brake pedal 12, it is possible to prevent the brake fluid pressure generated by the master cylinder 11 from being transmitted to the wheel cylinders 16, 17; 20, 21 through the second fluid pressure chambers 39A, 39B of the slave cylinder 23 before the slave cylinder 23 generates a brake fluid pressure.

Next, the control of lighting of the brake light 61 will be described.

When the driver applies a pushing force to depress the brake pedal 12, the resistance value of the stroke sensor Sd changes before the brake light switch Se is turned on. Therefore, the electronic control unit U that has detected this change in the resistance value turns the transistor 65 on, resulting in the coil 64b of the relay 64 being magnetized to close the contact 64a and light up the brake light 61. The instant the driver applies a pushing force to depress the brake pedal 12 and the stroke sensor Sd detects the stroke of the brake pedal 12, the slave cylinder 23 operates to generate a brake fluid pressure. Therefore, during normal system operation, it is possible to light up the brake light 61 the instant the slave cylinder 23 operates and transmits the brake fluid pressure to the wheel cylinders 16, 17; 20, 21. Slightly thereafter, the brake light switch Se is turned on. However, this does not affect the lighting of the brake light 61 because the relay 64 arranged in parallel to the brake light switch Se has already been turned on.

During abnormal system operation where the slave cylinder 23 becomes inoperative, the brake fluid pressure generated by the master cylinder is transmitted to the wheel cylinders 16, 17; 20, 21 through the second fluid pressure chambers 39A, 39B of the slave cylinder 23 that have stopped operation. However, the timing at which the pistons 13C, 13D of the master cylinder 11 close the port in communication with the reservoir 31 to generate a brake fluid pressure is later than the timing at which the slave cylinder 23 generates its intrinsic brake fluid pressure.

However, during abnormal system operation, the electronic control unit U does not output an operation signal to the transistor 65 even when the resistance value of the stroke sensor Sd changes, and thus the relay 64 is not turned on to light up the brake light 61. Instead, the brake light switch Se is turned on and the brake light 61 lights up. That is, even when the timing at which the brake fluid pressure is transmitted to the wheel cylinders 16, 17; 20, 21 during abnormal system operation is delayed as compared to that timing during normal system operation, the timing at which the brake light 61 lights up is also delayed accordingly. Therefore, it is possible to light up the brake light 61 with an appropriate timing during both the normal system operation and the abnormal system operation.

Figure 4:
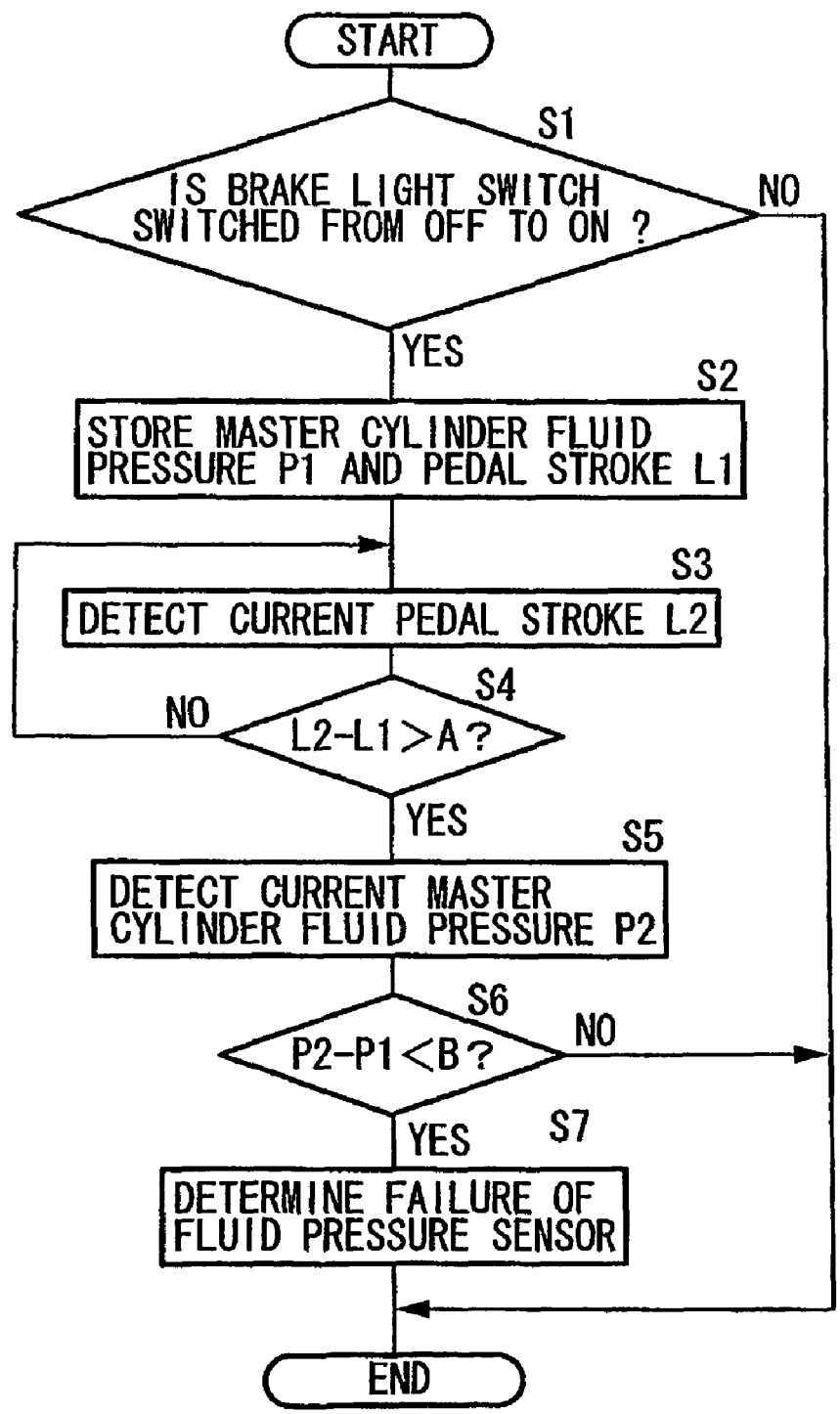
FIG. 4 is a flowchart for explaining trouble determination relative to a fluid pressure sensor.

In this embodiment, because the brake system comprises the brake light switch Se and the stroke sensor Sd, it is possible to determine a failure in the fluid pressure sensor Sa that detects the brake fluid pressure generated by the master cylinder 11. The method of this failure determination will be described below with reference to the flowchart of FIG. 4.

First, when the brake light switch Se is switched from a turned-off state to a turned-on state at Step S1, a first brake fluid pressure P1 generated by the master cylinder 11, i.e., a detection value of the fluid pressure sensor Sa is stored, and also a detection value L1 of the stroke detected by the stroke sensor Sd is stored at Step S2. Subsequently, at Step S3, a current second stroke position L2 is detected by the stroke sensor Sd. If a value (L2−L1), i.e., the difference between the first stroke position L1 and the second stroke position L2, exceeds a threshold value A at Step S4, a second brake fluid pressure P2 that is being generated by the master cylinder 11 is detected by the fluid pressure sensor Sa at Step S5. If at Step S6 a value (P2−P1), i.e., the difference between a second brake fluid pressure P2 and a first brake fluid pressure P1, is less than a threshold value B, that is, if the brake fluid pressure difference (P2−P1) corresponding to the stroke position difference (L2−L1) of the brake pedal 12 is not detected, it is determined at Step S7 that the fluid pressure sensor Sa has failed.

An exemplary embodiment of the present invention has been described above, but various changes in design may be made without departing from the subject matter of the present invention as set forth in the appended claims.

For example, the first stroke sensor of the present invention is not limited to the stroke sensor Sd of the exemplary embodiment, and it is possible to use a switch that is turned on when the brake pedal 12 is depressed a predetermined amount of stroke. However, the first sensor is still required to turn on earlier than the second sensor (the brake light switch Se).

What is claimed is:

1. A brake system comprising:
    a master cylinder that generates brake fluid pressure by a braking operation of a driver;
    an electric motor-driven slave cylinder that generates brake fluid pressure according to an electrical signal based on the braking operation of the driver;
    a wheel cylinder that brakes a wheel by the brake fluid pressure of the master cylinder or the slave cylinder;
    a brake light that informs a following vehicle of the operation of the wheel cylinder; and
    a first sensor and a second sensor that detect stroke positions of the brake pedal, wherein
    the brake fluid pressure of the slave cylinder is transmitted to the wheel cylinder when the slave cylinder operates normally, and the brake fluid pressure of the master cylinder is transmitted to the wheel cylinder through the slave cylinder when the slave cylinder does not operate normally, and wherein
    the first sensor activates the brake light based on a timing at which the slave cylinder generates brake fluid pressure when the slave cylinder operates normally, and the second sensor activates the brake light based on a timing at which the master cylinder generates brake fluid pressure when the slave cylinder does not operate normally.

2. The brake system according to claim 1, wherein the first sensor is a sensor that generates an electrical signal responsive to an operating amount of the brake pedal by the driver.

3. The brake system according to claim 2, further comprising a first fluid pressure sensor which detects brake fluid pressure generated by the master cylinder, and a second fluid pressure sensor which detects brake fluid pressure generated by the slave cylinder,
    wherein the slave cylinder generates brake fluid pressure so that the brake fluid pressure detected by the second fluid pressure sensor is adjusted to a level corresponding to the brake fluid pressure detected by the first fluid pressure sensor.

4. The brake system according to claim 3, further comprising a trouble determining device which determines when the first fluid pressure sensor has failed,
    wherein the trouble determining device stores a first stroke position of the brake pedal and a first detection value of the first fluid pressure sensor when the second stroke sensor is turned on; and when a difference between a current second stroke position and the first stroke position of the brake pedal exceeds a stroke threshold value, if a difference between a current second detection value and the first detection value of the first fluid pressure sensor is less than a fluid pressure threshold value, the trouble determining device determines that the first fluid sensor has failed.

5. The brake system according to claim 4, further comprising a first fluid pressure sensor which detects brake fluid pressure generated by the master cylinder, and a second fluid pressure sensor which detects brake fluid pressure generated by the slave cylinder,
    wherein the controller controls the slave cylinder to generate brake fluid pressure so that the brake fluid pressure detected by the second fluid pressure sensor is adjusted to a level corresponding to the brake fluid pressure detected by the first fluid pressure sensor.

6. The brake system according to claim 4, further comprising a stroke simulator connected to the master cylinder through a reaction force permission valve, wherein the stroke simulator absorbs the brake fluid pressure generated by the master cylinder by opening the reaction force permission valve during normal system operation; and the brake fluid pressure generated by the master cylinder is supplied to the wheel cylinder by closing the reaction force permission valve during abnormal system operation.

7. The brake system according to claim 2, further comprising a stroke simulator connected to the master cylinder through a reaction force permission valve, wherein the stroke simulator absorbs the brake fluid pressure generated by the master cylinder by opening the reaction force permission valve during normal system operation; and the brake fluid pressure generated by the master cylinder is supplied to the wheel cylinder by closing the reaction force permission valve during abnormal system operation.

8. The brake system according to claim 1, further comprising a first fluid pressure sensor which detects brake fluid pressure generated by the master cylinder, and a second fluid pressure sensor which detects brake fluid pressure generated by the slave cylinder, wherein the slave cylinder generates brake fluid pressure so that the brake fluid pressure detected by the second fluid pressure sensor is adjusted to a level corresponding to the brake fluid pressure detected by the first fluid pressure sensor.

9. The brake system according to claim 8, further comprising a trouble determining device which determines when the first fluid pressure sensor has failed, wherein the trouble determining device stores a first stroke position of the brake pedal and a first detection value of the first fluid pressure sensor when the second stroke sensor is turned on; and when a difference between a current second stroke position and the first stroke position of the brake pedal exceeds a stroke threshold value, if a difference between a current second detection value and the first detection value of the first fluid pressure sensor is less than a fluid pressure threshold value, the trouble determining device determines that the first fluid sensor has failed.

10. The brake system according to claim 1, further comprising a stroke simulator connected to the master cylinder through a reaction force permission valve, wherein the stroke simulator absorbs the brake fluid pressure generated by the master cylinder by opening the reaction force permission valve during normal system operation; and the brake fluid pressure generated by the master cylinder is supplied to the wheel cylinder by closing the reaction force permission valve during abnormal system operation.

11. A brake system comprising:

a controller;

a master cylinder that generates brake fluid pressure by a braking operation of a driver;

an electric motor-driven slave cylinder that generates brake fluid pressure according to an electrical signal based on the braking operation of the driver;

a wheel cylinder that brakes a wheel by the brake fluid pressure of the master cylinder or the slave cylinder;

a brake light that informs a following vehicle of the operation of the wheel cylinder; and a first sensor and a second sensor that detect stroke positions of the brake pedal, wherein the controller controls the system based on output signals of the first and second sensors such that the brake fluid pressure of the slave cylinder is transmitted to the wheel cylinder when the slave cylinder operates normally, and the brake fluid pressure of the master cylinder is transmitted to the wheel cylinder through the slave cylinder when the slave cylinder does not operate normally, and wherein the first sensor generates an electrical signal responsive to an operating amount of the brake pedal by the driver to activate the brake light when the slave cylinder operates normally, and the second sensor generates an electrical signal responsive to an operating amount of the brake pedal to activate the brake light when the slave cylinder does not operate normally.

12. The brake system according to claim 11, further comprising a trouble determining device which determines when the first fluid pressure sensor has failed, wherein the trouble determining device stores a first stroke position of the brake pedal and a first detection value of the first fluid pressure sensor when the second stroke sensor is turned on; and when a difference between a current second stroke position and the first stroke position of the brake pedal exceeds a stroke threshold value, if a difference between a current second detection value and the first detection value of the first fluid pressure sensor is less than a fluid pressure threshold value, the trouble determining device determines that the first fluid sensor has failed.

* * * * *